No. 803,909. PATENTED NOV. 7, 1905.
W. K. KIGHT.
LENS FOR EYEGLASSES.
APPLICATION FILED MAY 11, 1905.

Witnesses:
G. A. Pennington
H. J. Fletcher

Inventor:
William K. Kight,
by Bakewell Cornwall
Attys.

UNITED STATES PATENT OFFICE.

WILLIAM K. KIGHT, OF DEXTER, MISSOURI, ASSIGNOR OF ONE-THIRD TO ROBERT F. JEAN, OF DEXTER, MISSOURI.

LENS FOR EYEGLASSES.

No. 803,909.           Specification of Letters Patent.           Patented Nov. 7, 1905.

Application filed May 11, 1905. Serial No. 259,979.

*To all whom it may concern:*

Be it known that I, WILLIAM K. KIGHT, a citizen of the United States, residing at Dexter, Stoddard county, Missouri, have invented a certain new and useful Improvement in Lenses for Eyeglasses, of which the following is a full, clear, and exact description, such as will enable others skilled in the art to which it appertains to make and use the same, reference being had to the accompanying drawings, forming part of this specification, in which—

Figure 1:
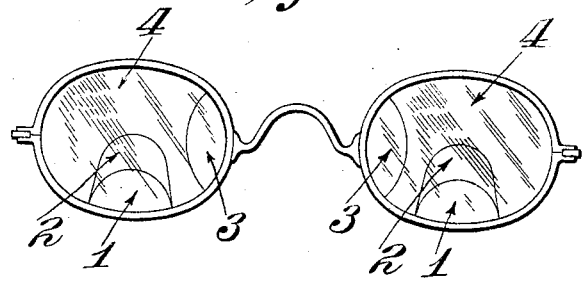
Figure 2:
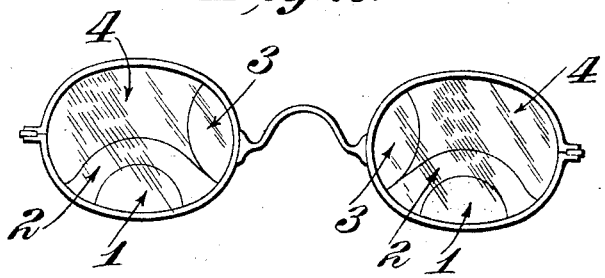

Figure 1 is an elevational view of a pair of eyeglasses, showing my improved lens in position therein; and Fig. 2 is a similar view of a modified form of lens.

This invention relates to a new and useful improvement in quadrafocal lenses for eyeglasses, the object being to construct a lens with a plurality of intermediate fields or visions whereby the wearer may have his vision focalized on objects at intermediate distances.

In the drawings I have shown several forms of lenses for carrying out my invention, and it is obvious that these lenses can be made up by the attachment of separate wafers or by grinding, as is well known in this art. Therefore I do not wish to be understood as limiting my invention to any particular method of manufacturing or constructing the lens.

Referring to Fig. 1, 1 is a field or vision which is preferably focalized at about fifteen inches for close reading, said field being located in the lower portion of the lens, its vertical depth being sufficiently reduced so that it is not in the line of sight when the wearer is walking. The fields or visions 2 are above the fields 1 and are focalized at about thirty inches, so as to furnish normal vision in walking. Fields or visions 3 are preferably located on the inner ends of the lens adjacent the nose, and these are focalized at about thirty-two inches, or such distance as will supply normal vision on the sight of a gun. Fields or visions 4 are focalized at normal distance vision, usually about twenty feet. The visions 3 are so located as to be especially useful for sportsmen or others who enjoy shooting a rifle or shotgun.

It is designed that the wearer in shooting shall employ both eyes. As the head is tilted to glance along the barrel of the gun the line of sight of one eye passes through the field 3 and of the other eye through the field 4. In this case field 3 is focalized on the sight of the gun and field 4 on the object aimed at. Under these conditions the two visions become so blended that the resultant accommodation is substantially equivalent to normal vision.

In speaking of the field or vision 4 as a "long-distance" vision it is obvious that this lens could be an ordinary plano glass or weak or strong, as occasion may demand.

For the particular uses to which the quadrafocal lens above described are especially adapted it is preferable that the field or vision 3 shall be located at the inner end of the lens and extend above the line of the major axis of the lens. In Fig. 2 the above conditions are observed, but in this instance the field or vision 2 is extended laterally, so as to be useful to the wearer in looking straight ahead as well as obliquely and downwardly.

Having thus described the invention, what is claimed as new, and desired to be secured by Letters Patent, is—

The herein-described lens for eyeglasses comprising a short reading field or vision 1 located in the lower portion of the lens, an intermediate field or vision 2 located above the field 1 and focalized at a walking distance, a field or vision 3 located at the inner end of the lens and focalized at a point between the fields 1 and 2, and a long-distance vision or field 4 comprising the major portion of the lens above its major axis; substantially as described.

In testimony whereof I hereunto affix my signature, in the presence of two witnesses, this 8th day of May, 1905.

WILLIAM K. KIGHT.

Witnesses:
     F. R. CORNWALL,
     GEORGE BAKEWELL.